Nov. 13, 1934.　　　　H. GRÜNDLER　　　　1,980,199
WATER FAUCET
Filed Aug. 29, 1931　　　2 Sheets-Sheet 1
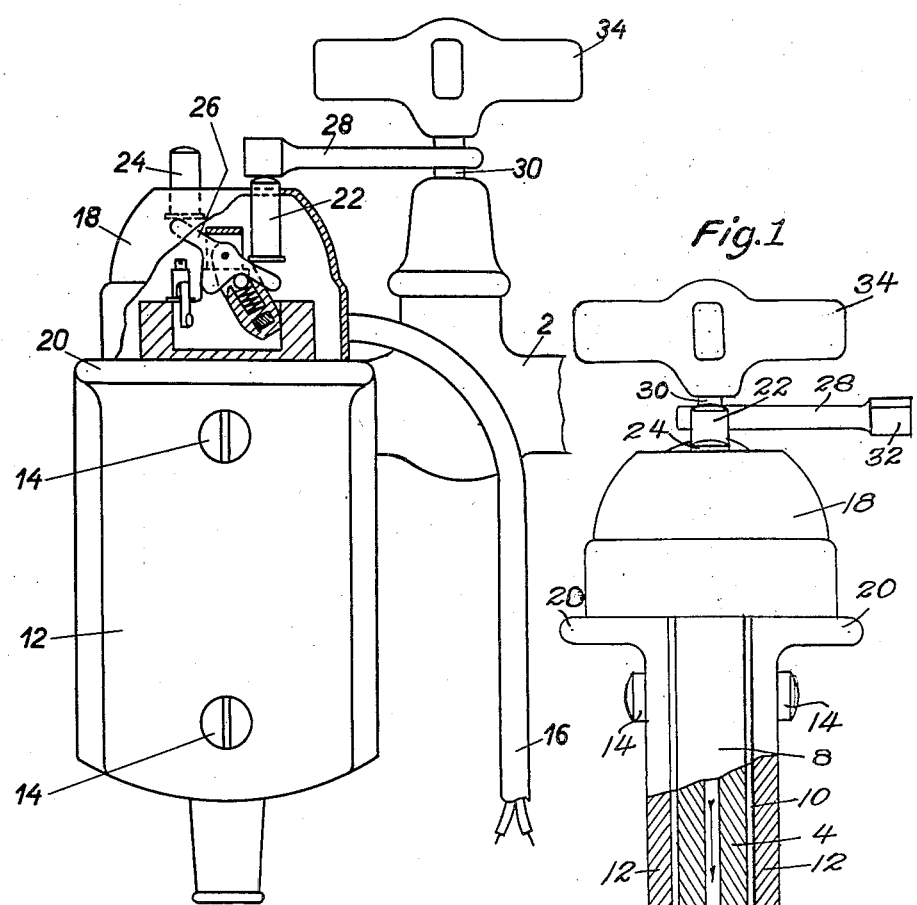

Nov. 13, 1934.  H. GRÜNDLER  1,980,199
WATER FAUCET
Filed Aug. 29, 1931  2 Sheets-Sheet 2

Inventor:
Herta Gründler
by Edward H. Palmer
Atty.

Patented Nov. 13, 1934

1,980,199

UNITED STATES PATENT OFFICE 1,980,199

WATER FAUCET

Herta Gründler, Berlin-Wilmersdorf, Germany, assignor to Elektricitätsgesellschaft "Sanitas", Berlin, Germany, a corporation of Germany Application August 29, 1931, Serial No. 560,159
In Germany September 1, 1930

7 Claims. (Cl. 219—39)

This invention relates to water faucets having provision for supplying hot water.

One object of the invention is to provide such a faucet, the discharge pipe or part through which the discharge passage extends being electrically heated to heat the water flowing through the faucet.

Another object of the invention is to provide such a faucet which shall offer greater security than heretofore against contact potentials.

Other objects of the invention will appear in the following description.

The invention and its aims and objects will be readily understood from the following description taken in connection with the accompanying drawings of one illustrative embodiment of the invention, the true scope of the invention being more particularly pointed out in the appended claims.

In the drawings:

Fig. 1 is a front sectional elevation of one illustrative embodiment of the invention, the parts being shown in water-drawing position;

Fig. 2 is a side elevation of the illustrative embodiment of the invention shown in Fig. 1 with the faucet closed and the switch in locked open position, the switch casing being partially broken away to show the interior construction;

Figure 3:
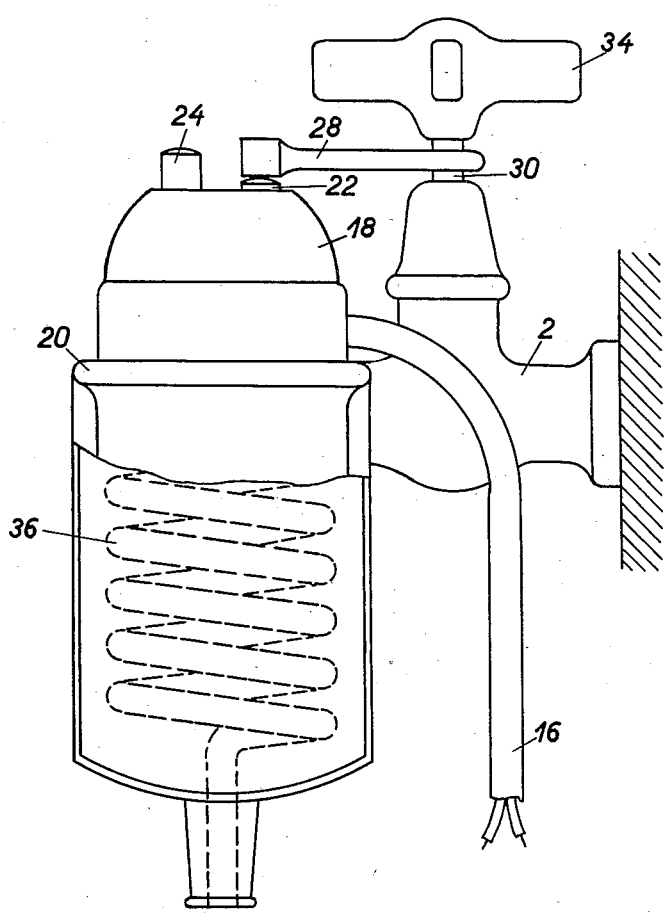
Fig. 3 is a side elevation showing a coil having horizontal windings to conduct the water through the heating chamber.

In accordance with the invention that part of the faucet which serves to heat the water will preferably be constructed to offer as large a heating surface as possible, and with this end in view, said part may be in the form of a cylindrical chamber or of flat construction with relatively wide lateral walls, or it may be in the form of a coil.

In the embodiment of the invention herein shown for illustrative purposes, said heating part is constituted by that portion 4 of the faucet through the passage 3 of which the water is discharged, and said portion is of flattened shape, having lateral walls 6 which are relatively wide as compared to its end walls 8, as clearly shown in Figs. 1 and 2, to offer as large or extensive a heating surface as possible. Contiguous to each of the wider walls 6 there is provided an electrical resistance 10, said resistances being pressed against the outer surfaces of said walls 6 by the side walls 12—12 of the outer casing, said side walls 12—12 being held in place by screws 14 extending through said side walls 12—12 and having screw-threaded connection with suitable screw-threaded openings in said lateral walls 6, 6. Said resistances are supplied with current from any suitable source of supply (not shown) through cable 16 and switch 18. The outer walls 12—12 are preferably made of heat-insulating material, such as porcelain or the like, and support the switch 18 upon their laterally extended flat portions 20—20, to which the switch casing may be secured in any suitable manner. Any suitable switch may be used, that herein shown being of the conventional push-button type, in which inward pressing of the button 22 acts to throw out the switch and simultaneously to raise the button 24 by downward pressure of one end of the two-arm lever 26 and raising of its other end upon which the button 24 rests. Inward pressure of the button 24 throws in the switch and simultaneously raises the button 22.

Preferably means is provided in accordance with the invention whereby the switch will be opened automatically and the heating current broken when the water is turned off. On the other hand when the water is turned on the switch will preferably not be automatically thrown in to turn on the heating current, this requiring a separate operation. The faucet may thus be used for supplying either hot or cold water as desired, but if the switch has been thrown in to supply hot water, the cutting out of the heating current is assured when the water is turned off. The invention contemplates the provision of suitable means for this purpose, preferably operable by the valve operating means, the valve operating handle 34 for example in the illustrative embodiment of the invention. The means to cut out the current when the water is turned off herein conveniently comprises an arm 28 rigidly secured at one end to the valve spindle 30 of the faucet and provided at its other end with a cam member 32 having its cam surface suitably inclined to engage the top of the button 22 and press it inwardly to throw out the switch as the valve spindle is turned by its handle 34 to turn off the water. In this position of the parts, the switch is positively locked in open position, so that it cannot be thrown in accidentally while the water is turned off. When the valve spindle is turned by means of its handle 34 to turn on the water, the button 22 is freed and the button 24 can then be pressed inwardly to throw in the switch to heat the water as it flows through the faucet.

When water is flowing downwardly through a straight vertical pipe or passage heated from the outside, the water will be heated and the water leaving the pipe will naturally be warmer than the water entering said pipe or passage. The water leaving the pipe or in the lower part thereof will therefore have a lower specific weight than the water entering the pipe and will tend to rise in the pipe. So long as this upward urge of the heated water is not sufficiently strong to overcome the downward flow of the water the faucet will function normally, the warmest water being discharged from the faucet, but if the strength of the downward flow of the water is such that it is outweighed by said upward urge, the warmest water will no longer be at the discharge end of the pipe or passage but will tend to work its way upwardly therein. In accordance with the present invention means may be provided to prevent such a situation arising. An illustrative embodiment of such means is shown in Fig. 3 wherein the water is conducted through a coil having substantially horizontal windings.

The arm 28 will preferably be adjustable angularly upon the valve spindle 30. This enables the highest temperature obtainable with the least flow of water to be regulated.

In addition to the advantages already pointed out, the present invention renders faucets embodying the same much more secure from dangerous contact potentials than those heretofore used provided with a heating attachment for the running water. The dictates of safety require that tension-carrying parts that are in the vicinity of grounded parts, shall be surrounded by a metal covering. In the present invention the faucet being directly heated, the requirement as to safety is fulfilled. But in the case of faucets with heating attachments it may easily happen that the electrical connection of the metal covering above referred to for the heating means with the water faucet, which is at earth potential, is faulty and inadequate without this defect being noticed by the user. This situation may arise also where the heating means is screwed to the water faucet, for the reason that a tight closure between two metal parts can be secured only by the interposition of packing material which in itself generally precludes a good electrical connection between said parts or impairs such connection.

Other advantages of faucets embodying the present invention as compared with devices for the same purpose heretofore used will be readily apparent to those skilled in the art from the foregoing description.

I am aware that my present invention may be embodied in other specific forms than that herein described without departing from the spirit or essential attributes thereof, and I therefore desire the present embodiment of said invention to be considered in all respects as illustrative and not restrictive, reference being had to the appended claims rather than to the foregoing description to indicate the scope of the invention.

I claim:

1. A water faucet comprising, in combination, means to control the flow of water through said faucet; electrical heating means to heat the water passing through said faucet; a switch to connect and disconnect said heating means with a suitable source of electrical energy; means actuated by said water flow controlling means to open said switch when said flow controlling means is operated to stop said flow, but inoperable to close said switch; and additional means for operating said switch independently of said flow controlling means.

2. A water faucet comprising, in combination, means to control the flow of water through said faucet; electrical heating means to heat the water passing through said faucet; a switch to connect and disconnect said heating means with a suitable source of electrical energy; means actuated by said water flow controlling means to open said switch when said flow controlling means is operated to stop said flow, but inoperable to close said switch; additional means for operating said switch independently of said flow controlling means; and means to prevent operation of said additional switch operating means when the flow of water is cut off.

3. A water faucet comprising, in combination, means to heat the water passing through said faucet; operating means to render said heating means operative and inoperative; means to control the flow of water through said faucet; means operable by operation of said water flow controlling means to render said operating means inoperative when said water flow controlling means is operated to stop the flow of water, but inoperable by said water flow controlling means to render said heating means operative.

4. A water faucet comprising, in combination, means to control the flow of water through said faucet; electrical heating means to heat the water passing through said faucet; a switch to connect and disconnect said heating means with a suitable source of electrical energy; and a member operatively connected to said water flow controlling means and operable by the latter to open said switch when said flow controlling means is operated to stop said flow, but inoperable to close said switch.

5. A water faucet comprising, in combination, means to control the flow of water through said faucet; electrical heating means to heat the water passing through said faucet; a switch to connect and disconnect said heating means with a suitable source of electrical energy; and a member operatively connected to said water flow controlling means and operable by the latter to open said switch when said flow controlling means is operated to stop said flow but inoperable to close said switch, said member being adjustable to vary the moment when it becomes effective to open said switch.

6. A water faucet comprising, in combination, heating means to heat the water passing through said faucet; means to control the flow of water through said faucet; means operable by said flow controlling means to render said heating means inoperative but inoperable to render said heating means operative; separate means to render said heating means operative; and means to prevent operation of said separate means when the flow of water is cut off by said flow controlling means.

7. A water faucet comprising, in combination, heating means to heat the water passing through said faucet; means to control the flow of water through said faucet; means operable by said flow controlling means to render said heating means inoperative but inoperable to render said heating means operative; separate means to render said heating means operative; and means controlled by said flow controlling means to prevent operation of said separate means when the flow of water is cut off by said flow controlling means.

HERTA GRÜNDLER.